F. REAUGH.
INTERNAL COMBUSTION ENGINE.
APPLICATION FILED NOV. 1, 1904.
948,248.
Patented Feb. 1, 1910.
7 SHEETS—SHEET 1.
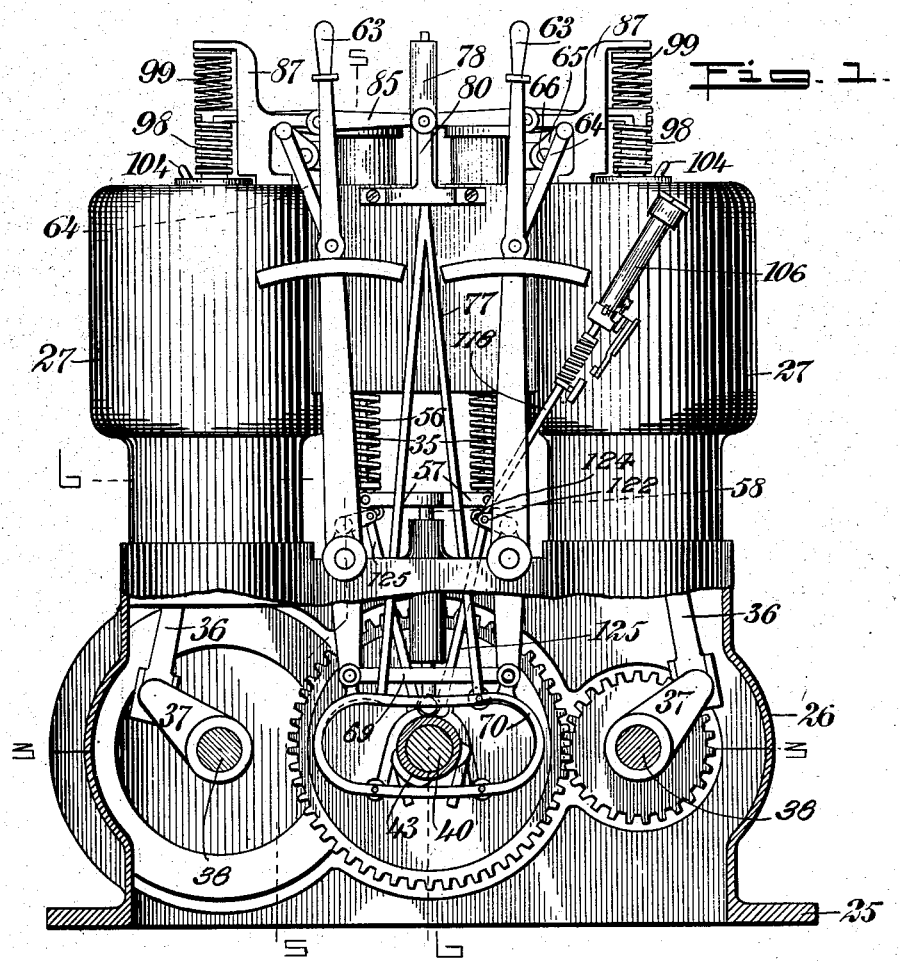
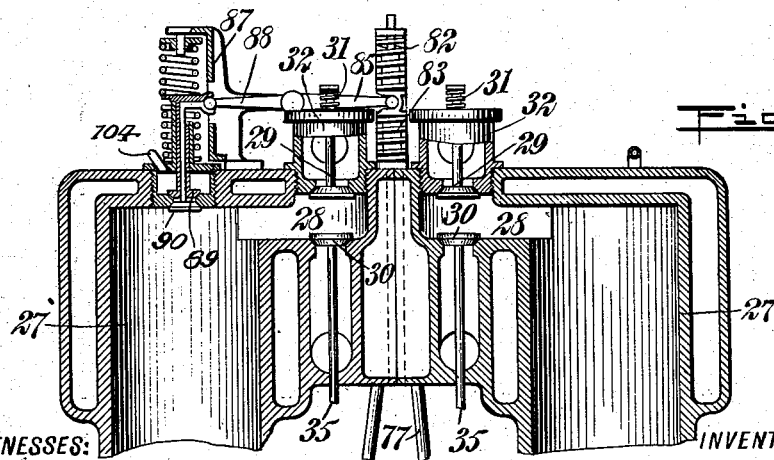
WITNESSES:
C. A. Jarvis.
INVENTOR
Frank Reaugh
BY
ATTORNEYS

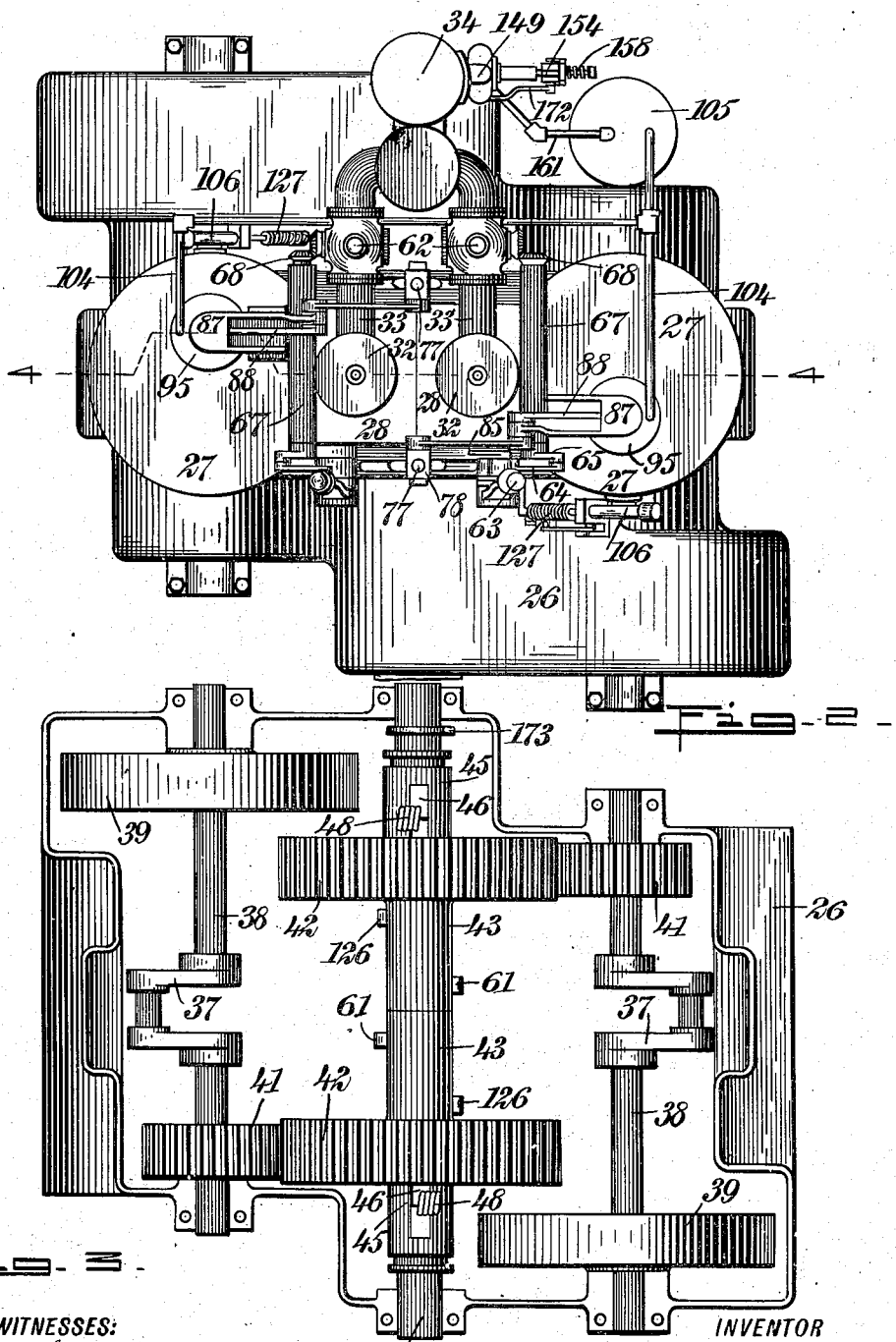

F. REAUGH.
INTERNAL COMBUSTION ENGINE.
APPLICATION FILED NOV. 1, 1904.
948,248.
Patented Feb. 1, 1910.
7 SHEETS—SHEET 3.
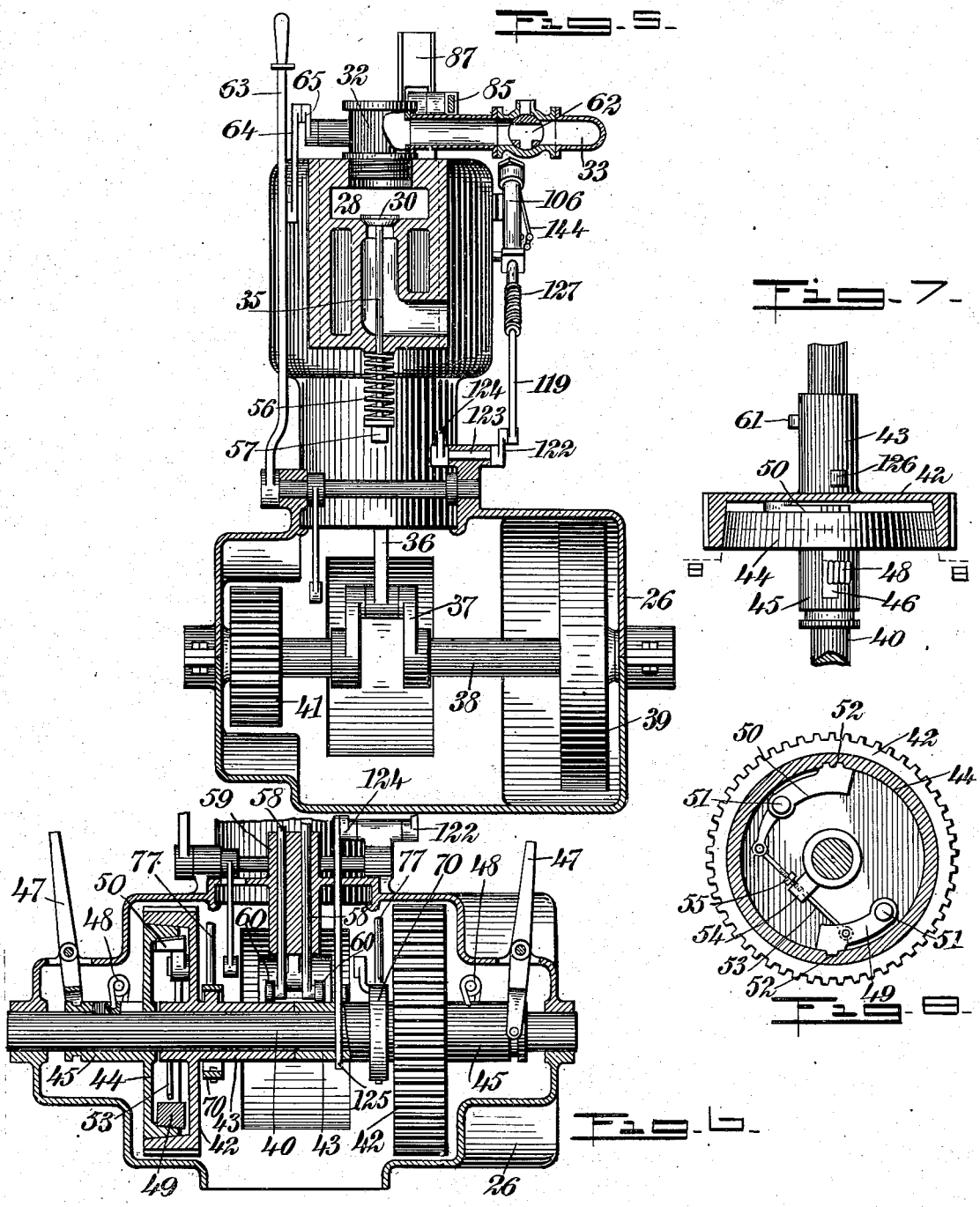
WITNESSES
C. A. Jarvis.
Isaac B. Owens.
INVENTOR
Frank Reaugh
BY
ATTORNEYS

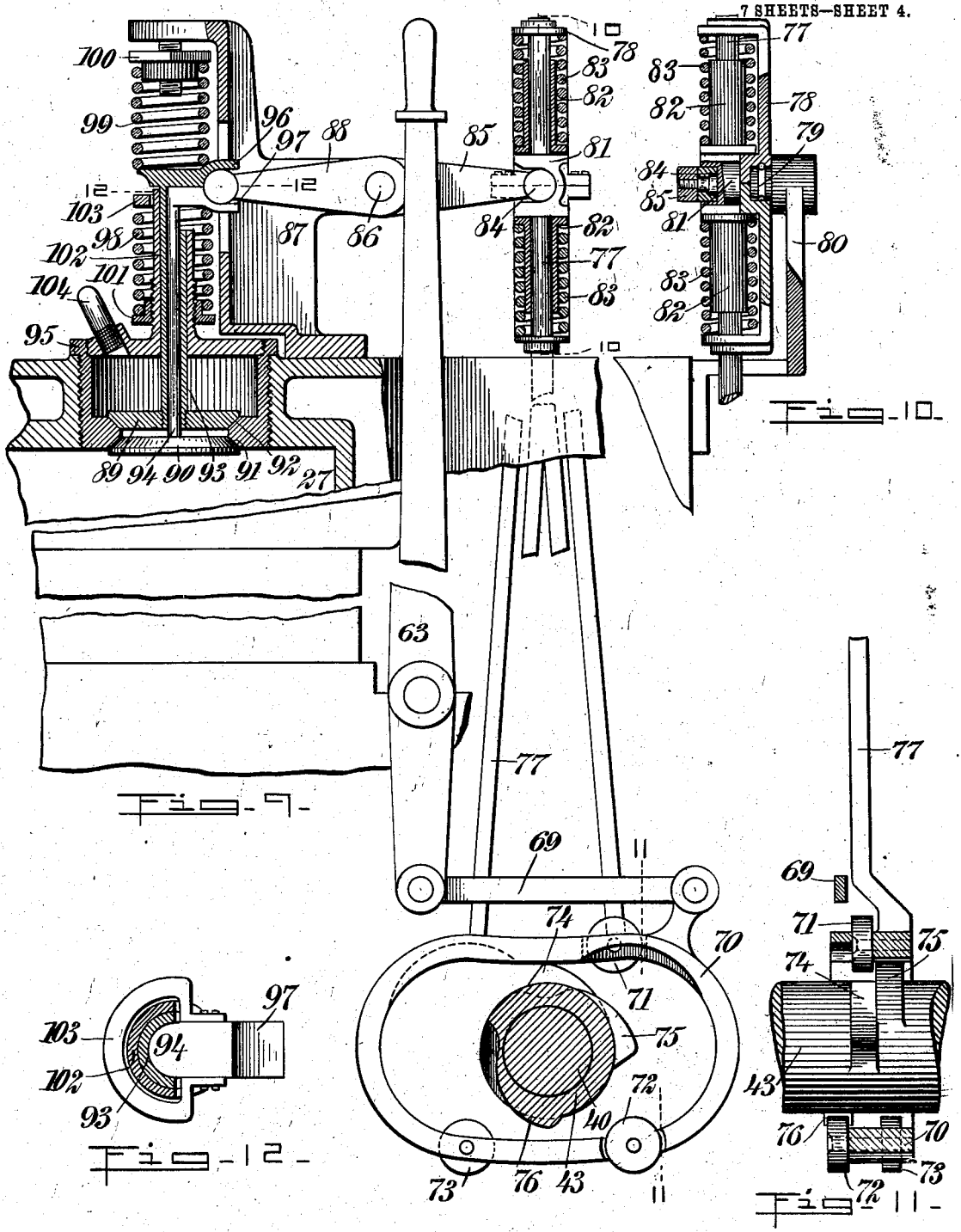

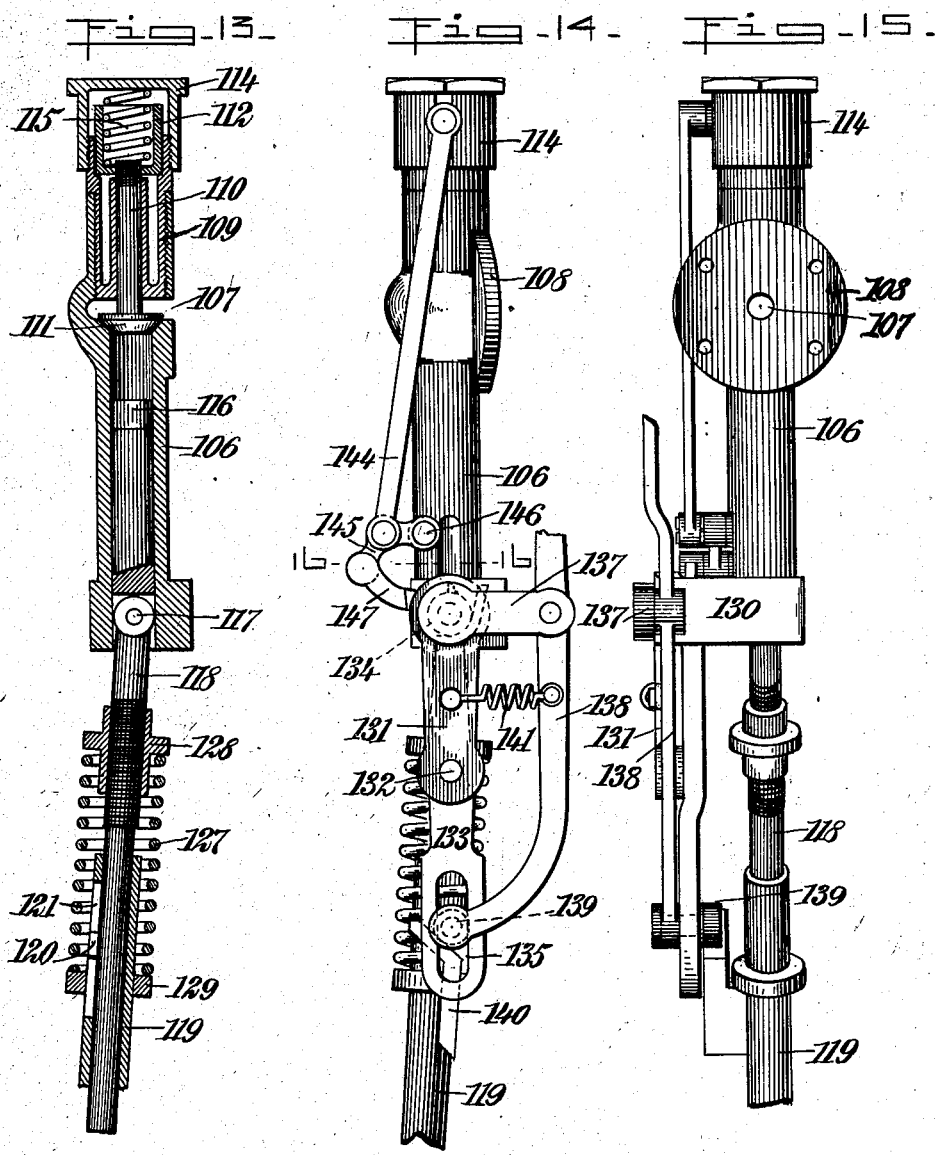

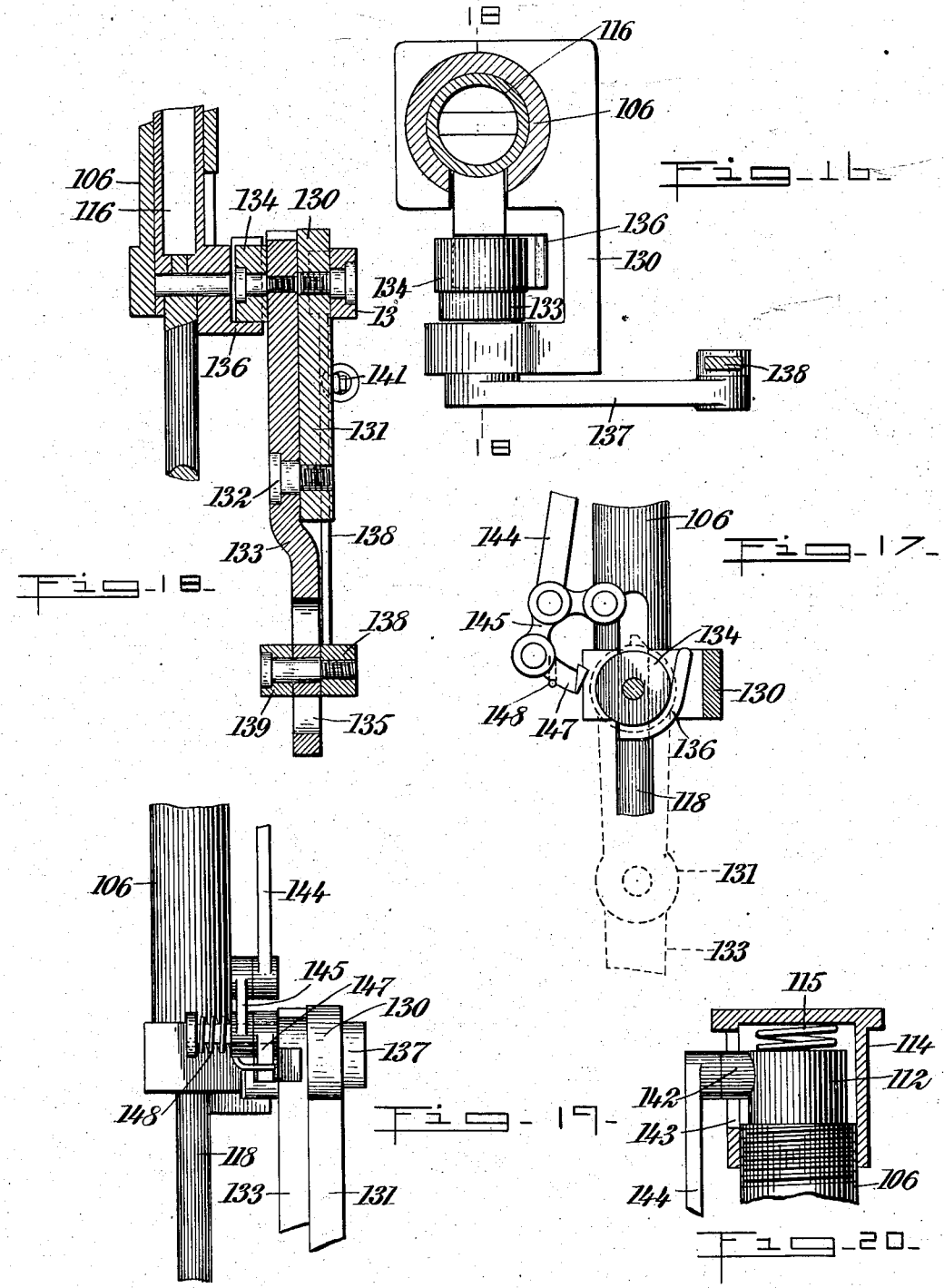

F. REAUGH.
INTERNAL COMBUSTION ENGINE.
APPLICATION FILED NOV. 1, 1904.
948,248.
Patented Feb. 1, 1910.
7 SHEETS—SHEET 7.
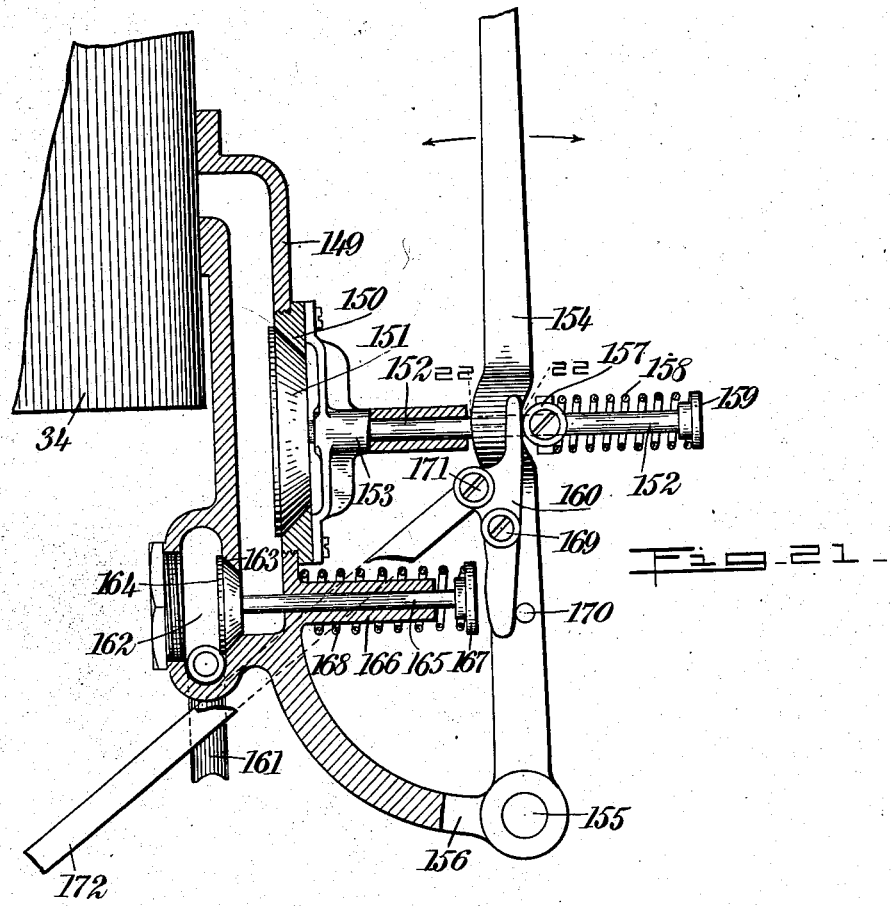
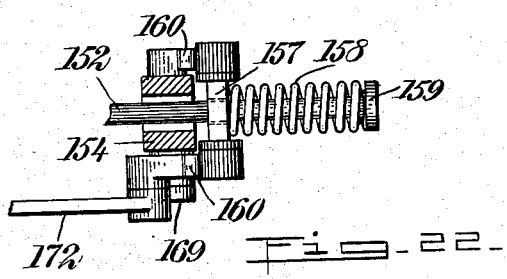
WITNESSES:
C. A. Jarvis.
Isaac B Owens.
INVENTOR
Frank Reaugh
BY
ATTORNEYS

UNITED STATES PATENT OFFICE.

FRANK REAUGH, OF OAK CLIFF, TEXAS.

INTERNAL-COMBUSTION ENGINE.

948,248.

Specification of Letters Patent.    Patented Feb. 1, 1910.

Application filed November 1, 1904. Serial No. 230,909.

*To all whom it may concern:*

Be it known that I, FRANK REAUGH, a citizen of the United States, and a resident of Oak Cliff, in the county of Dallas and State of Texas, have invented a new and Improved Internal-Combustion Engine, of which the following is a full, clear, and exact description.

The invention relates to certain improvements in internal combustion engines using gaseous fuel, such for instance as a mixture of air and gas or of air and hydrocarbon oil.

The prime objects of the invention are to admit of greater economy in operation and a wider control of the engine than has heretofore been possible in engines of this class.

To these ends the invention resides in a peculiar arrangement of a plurality of cylinders in conjunction with a single main or engine shaft, with which shaft one or all of the cylinders may be connected independently and at will, thus enabling the main shaft to be driven from the operation of a single cylinder while the other cylinder or cylinders with all of their immediately allied parts remain absolutely inactive.

The invention further involves an improved valvular mechanism which may be controlled manually or by governor action as desired, and through the medium of which cooled compressed air may be admitted to the engine cylinder, to increase initial compression or to start the operation of the engine. An air cushion may be formed in the cylinder to serve as a brake to the operation of the engine, and air may be compressed and sent to a suitable storage reservoir for subsequent use, thus utilizing certain energy developed by the engine which would otherwise be wasted.

There is illustrated in connection therewith certain means for igniting the cylinder charge, this means relating to the general type of igniters in which a portion of the cylinder charge is trapped and compressed to a degree sufficient to bring about spontaneous ignition, the device employed by me having such novel construction and organization as insures an effective propagation of flame and accurate timing of operation, involving at the same time a minimum negative work. There is also illustrated means for regulating the carbureter action of the engine, by means of which either free or compressed air may be admitted to the carbureter, thus allowing the carbureter to operate normally under the action of the free or atmospheric air and by admitting compressed air to increase the absorption of the liquid fuel, and increase the initial compression in the engine cylinder. And finally, the invention involves various other features of construction and organization of elements, all of which will be fully set forth hereinafter and pointed out in the claims.

Reference is had to the accompanying drawings which illustrate as an example the preferred embodiment of my invention, in which drawings like characters of reference indicate like parts in the several views, and in which—

Figure 1 is a front side elevation of the organized engine with part of the crank case broken away, and with the main or engine shaft and the two crank shafts in section; Fig. 2 is a plan view of the engine; Fig. 3 is a sectional plan of the engine and crank shafts on essentially the line 3—3 of Fig. 1; Fig. 4 is a fragmentary section of the upper ends of the engine cylinders on essentially the line 4—4 of Fig. 2, this view illustrating the inlet and exhaust valves as well as one of the valves for controlling the auxiliary air supply to the cylinders and devices for actuating said valves; Fig. 5 is an elevational section taken centrally through the engine on approximately the line 5—5 of Fig. 1; Fig. 6 is a sectional elevation of the lower part at one side of the engine on essentially the line 6—6 of Fig. 1; Fig. 7 is a detail plan with the spur gear in section and illustrating one of the clutches for connecting one of the crank shafts with the main or engine shaft; Fig. 8 is a sectional elevation of said clutch on the line 8—8 of Fig. 7; Fig. 9 is an enlarged fragmentary section showing one of the valves for controlling the auxiliary air supply to the engine cylinders, and illustrating also the peculiar cam and link devices for giving this valve its characteristic variable operation; Fig. 10 is a detail section on the line 10—10 of Fig. 9; Fig. 11 is a sectional elevation on the line 11—11 of Fig. 9; Fig. 12 is a detail section on the line 12—12 of Fig. 9; Fig. 13 is a longitudinal section of the igniter cylinder, showing the part which communicates with the engine cylinder, and also illustrating the sectional rod for operating the igniter piston; Fig. 14 is a side elevation of the igniter mechanism, illustrating the automatic trip devices by means of which the action of the igniter piston and valve are effected and timed; Fig. 15 is a side elevation of the igniter, looking toward the port thereof which communicates with the engine cylinder, and further illustrating the parts shown in Fig. 14; Fig. 16 is a sectional plan on the line 16—16 of Fig. 14; Fig. 17 is a fragmentary elevation illustrating the means for delaying the action of the igniter piston and for opening the igniter valve; Fig. 18 is a vertical section on the line 18—18 of Fig. 16, this view further illustrating the parts shown in Figs. 16 and 17; Fig. 19 is an elevational view of the parts shown in Fig. 18; Fig. 20 is a detail section of the devices for controlling the action of the igniter valve; Fig. 21 is a detail sectional elevation of the devices for controlling the carbureter action; and Fig. 22 is a detail section of such devices on essentially the line 22—22 of Fig. 21.

I will first describe the general organization of the multiple cylinder engine and the devices for throwing one or all of the cylinders into action, as desired, reference being had for this purpose particularly to Figs. 1 to 8 inclusive. The engine is provided with a base 25 supporting the crank case 26, which in turn supports two or more cylinders 27. These cylinders are intended to be water jacketed, or provided with other suitable devices for cooling them, and as shown best in Fig. 4 they are formed at their inner or adjacent sides with valve housings 28, in which are seated the in-take valves 29 and the exhaust valves 30. The inlet valves 29 are held yieldingly to their seats by springs 31 in the usual manner, or they may be controlled in other ways as desired. The casings 32 of the inlet valves communicate by conduits 33 with a carbureter 34. The exhaust valves 30 have stems 35 passing downward to the main or engine shaft, as will be hereinafter fully set forth. The cylinders 27 are fitted with pistons as usual, and the connecting rods 36 thereof are joined to cranks 37 forming parts of the crank shafts 38 which are revolubly mounted in the crank case 26 parallel to each other, and which may be fitted, if desired, with fly wheels 39. The pistons respectively impart their movements to the crank shafts 38, which shafts are revoluble independently of each other, as shown. 40 indicates the main or engine shaft which is revolubly mounted in the crank case between the shafts 38, and which is adapted to be connected with either or both of said shafts by devices which will be now described. The shafts 38 carry gears 41 which respectively mesh with spur gears 42. Said gears are carried securely on independent sleeves 43 which are mounted loose on the main shaft 40. The rims of the gears 42 overhang the webs to form internal clutch members, and coacting therewith are clutch cones 44 which are mounted to slide on and to turn with the main shaft by means of longitudinally splined hubs 45 receiving keys 46 suitably fastened to the main shaft. 47 indicates hand levers or other suitable means for sliding the hubs 45 and cones 44, causing them to engage or disengage the spur gears.

In order to hold the parts 44 and 45 yieldingly in either position, i. e., in active or inactive position, I provide coiled springs 48, the extremities of which are respectively pivotally mounted on the keys 46 and hubs 45, so that when the parts are in the position shown in Fig. 6, for example, the action of the springs will tend to engage the cones 44 with the spur gears, and when through the operation of the levers 47 the cones are moved out of such engagement and the position of the springs is reversed, said springs will act oppositely, that is to say, will serve yieldingly to hold the cones in their disengaged or engaged position. It will, therefore, appear that by the manipulation of the levers 47 the two sides of the engine may be operated conjointly, or one side may be operated to the exclusion of the other, as desired. This arrangement is particularly advantageous when operating under light loads since it avoids the waste of energy due to running one or more cylinders empty. It also serves as an easy method of starting the engine, since one side may be started when out of connection with the main shaft and then thrown into such connection, and the other side of the engine then started by power derived from the first mentioned side.

In order to increase the efficiency of the clutch, particularly when full speed has been attained, I provide a positive grip device, best shown in Figs. 7 and 8. This device comprises dissimilar dogs 49 and 50 pivoted on studs 51 carried by the spur gears 42. These dogs are adapted to be inclosed by the cone 44, and the inner surface of the cone is notched as indicated at 52 so as to receive corresponding teeth on the dogs. The dogs are connected by rods 53 which pass loosely through studs 54 on the hubs of the gears 42, and which are provided with stop nuts 55 to limit the outward movement of the dogs. These dogs 49 and 50 move outward by centrifugal force, and when the engine is running slowly and the clutch is thrown in, the dogs will not become positively active. When, however, full speed is attained the dogs will be thrown outward with sufficient force to bring about the secure engagement of their teeth with the corresponding notches 52 in the clutch cones 44, and the parts 44 and 42 will be locked firmly together, causing the movement to be transmitted through a positive, as contradistinguished from a frictional, connection. By providing dissimilar dogs 49 and 50, I insure that the cranks 37 when coupled together lie at the proper angle to each other. Reference to Fig. 6 will show that the teeth of the dogs 49 and 50 and the notches 52 of the cones 44 are so relatively disposed as not to interfere with the engaging and disengaging movements of the parts 44 with respect to the parts 49, 50 and 42. As shown best in Figs. 1 and 5, the exhaust valve stems 35 are provided with springs 56 tending yieldingly to seat the valves, and the lower ends of the stems are respectively engaged with arms 57 respectively carried by rods 58 (see Figs. 1 and 6). These rods are vertically mounted in a suitable guide 59 and carry rollers 60 at their lower ends, with which rollers cams 61 (see Fig. 3) respectively coact. Said cams 61 are attached respectively to the sleeves 43 so that the exhaust valve of one cylinder is operated by the sleeve 43 related to that cylinder, and the same is true of the exhaust valve of the other cylinder. In this way not only are the piston and crank shaft of the inactive cylinder kept idle, but the valve mechanism, and, as will hereinafter appear, the other operative parts of such cylinder, are kept at rest.

I will next describe the valvular mechanism for controlling the auxiliary air supply to the engine cylinders, reference being had particularly to the Figs. 1, 2 and 9 to 11 inclusive. As an adjunct of this mechanism, the conduits 33 connecting the inlet valve casings 32 with the carbureter 34 are provided with three-way valves 62 (see Figs. 2 and 5). These valves by proper operation may be disposed to connect the inlet valve casings with the carbureter or to close the carbureter communication and connect said casings with the atmosphere. 63 indicates the two levers for operating the auxiliary air supply valves, and these levers have connection with the said valves 62, so as to throw the valves 62 simultaneously with the operation of the levers. This connection is here shown to consist of links 64 pivoted to the hand levers 63 and to cranks 65 fastened on rock shafts 66. The rock shafts are mounted in suitable bearings 67 on top of the cylinders (see Fig. 2) and have connection by miter gears 68 with the respective valves 62 so that each time the levers 63 are thrown corresponding movements of the valves 62 take place, and the parts are so adjusted that the movements of the valves 62 will be synchronous with the operations of the auxiliary air supply valves as will hereinafter fully appear.

The levers 63 and their connected parts are independently operative and are respectively so related to the engine cylinders, that when the other parts of one cylinder are inactive the levers 63 and their connected parts are also inactive. Each lever is provided at its lower end with a link 69, said links being respectively pivoted to elongated collars 70. These collars respectively encircle the sleeves 43 of the gears 42, and are provided each with three rollers 71, 72 and 73, these rollers lying in different transverse planes, as shown in Fig. 11, and being respectively actuated by cams 74, 75 and 76 formed on or fastened to the sleeves 43, the cams also lying in different transverse planes so as to admit of the proper engagements between the cams and said rollers. When the parts are in the intermediate position shown in Fig. 9, the cams 74, 75 and 76 revolve without imparting movement to the collars 70. When, through the operation of the lever 63 the yoke 70 is shifted to one side or the other, engagement between the cams and rollers takes place, the cam engaged and the extent of the resultant action, depending upon the direction and extent of the movement of the lever 63. When the lever 63 is so moved a vertical movement is imparted to the collar 70. Attached to each yoke 70 is a bifurcated rod 77. Said rods extend upward and have their upper extremities mounted loosely in essentially U-shaped carriers 78. These carriers are pivotally sustained by horizontal studs 79, engaging the carriers intermediate their ends, so that the rods 77 are held to reciprocate freely in the carriers, and at the same time allowed a slight swinging movement due to the shifting of the collars 70, as before explained. The studs 79 are rigidly supported by arms 80 suitably attached to a rigid part of the engine. Each rod 77 is provided at a point within its carrier 78 with a socket 81 and at each side of this socket sleeves 82 are mounted loosely on the rod. Said sleeves are engaged by expansive coiled springs 83, which also engage the ends of the carrier 78, and which tend to hold the rods 77 yieldingly in their normal position, the rods being movable, however, under the action of the cams 74, 75 and 76, to either side of their normal position. In the said sockets 81 of the rods 77 are located rollers 84 respectively attached to arms 85. The rods 77 are arranged in line with the main shaft 40, and the arms 85 extend oppositely from this line respectively toward the cylinder heads, their outer ends being attached to rock shafts 86 mounted in brackets 87 rising from the cylinder heads, as best shown in Fig. 9. The shafts 86 also carry fixedly arms 88 which actuate the duplex valves for controlling the auxiliary air supply hereinbefore mentioned. These valves, as Fig. 9 best illustrates, are composed of puppet valve sections 89 and 90, one opening into the cylinder and one outward therefrom, and said sections being respectively seated upon oppositely disposed surfaces 91 and 92. The outwardly opening section 89 has a tubular stem 93 through which passes the stem 94 of the section 90. These telescopic stems pass outward through a box 95 placed in the cylinder head, and are respectively provided with lateral extensions 96 and 97 between which bear the outer or free ends of the arms 88, so that a downward rocking movement of either arm will open the valve section 90, and an upward movement of the arm will open the valve section 89. In this connection it will be observed that when the inwardly opening section 90 is opened by the mechanical action of the arm 88, the superior pressure within the cylinder will automatically unseat the outwardly opening section 89, and when the said section 89 is mechanically opened the superior pressure in the box 95 will automatically open the valve section 90. When both sections are seated, pressure will be communicated past the seats 91 and 92 in either direction.

The valve sections 89 and 90 are held yieldingly to their seats by springs 98 and 99. These springs are expansive and bear respectively on the extensions 97 and 96 of the valve stems, and on collars 100 and 101 fastened to the brackets 87 and to tubular stem guides 102 in the box 95. For the purpose of permitting effective engagement between the spring 98 and the said extension 97 of the stem 94, a yoke or other equivalent device 103 is attached to the extension 97 and loosely surrounds the sleeve 102 and tubular stem 93, as best shown in Fig. 12. The box 95 of each cylinder communicates by a pipe 104 with a compressed air reservoir 105 (see Fig. 2). The form and relative disposition of the cams 74, 75 and 76 are so calculated, that by pre-arranged shifting of the levers 63 the necessary variety of movement may be imparted to the rods 77, so as to bring about the mechanical unseating of either of the valve members 89 and 90, and to control the period during which this unseating takes place. In this manner the said valve members may be operated so that when the engine is running the fuel mixture supply may be cut off and the engine operated as a pump, compressing air in the reservoir 105 and at the same time retarding the engine movement, thus performing the double function of a brake and compressor, or the valve members may be so controlled as to admit into the engine cylinder in addition to its normal charge a certain quantity of compressed air, thus materially increasing the initial compression in the engine cylinder. Also, this auxiliary air supply apparatus may be utilized to control the carbureter action, as will hereinafter fully appear. When the auxiliary air supply valves are adjusted to permit compression of atmospheric air within the engine cylinders, the movement of the lever 63 incident to this adjustment also brings about a movement of the rock shaft 66 (see Figs. 1 and 2) and this adjusts the three-way valves 62 so as to close the carbureter communication with the inlet valve boxes 32 and to open the communication between said boxes and the atmosphere, thus allowing atmospheric air to be drawn into the cylinders whereupon it will be compressed and discharged through the box 95 and pipe 104, as before explained.

The igniter is illustrated in Figs. 13 to 20 inclusive. It is applied only to such cylinders as indicated in Figs. 1 and 2. 106 indicates the igniter cylinder which is formed with a port 107 adapted to communicate with the interior of the engine cylinder and provided with a flange 108 surrounding this port to facilitate fastening the igniter in place. Within the upper part of the cylinder 106 is placed a bushing 109 in which operates the stem 110 of a valve 111, which opens toward the engine cylinder and controls the fluid movement from the lower part of the igniter cylinder through the port 107. A head 112 is attached to the upper end of the stem 110, and working against this head and against a cap 114 is an expansive spring 115 which serves yieldingly to seat said valve 111. In the lower part of the cylinder 106 a piston 116 operates. This piston is articulated by a pin 117 to a rod 118. The rod in turn is slidably fitted in a sleeve 119 and provided with a feather 120 operating in a slot 121 in said sleeve whereby to allow the parts 118 and 119 a limited independent movement. As best shown in Figs. 1 and 5 the sleeve 119 extends downward to a crank 122 on a rock shaft 123 suitably mounted on the engine frame. Said shaft carries a second crank 124 to which is joined a rod 125. This rod is forked at its lower end and the fork straddles the sleeve 43 of the gear 42 related to the same cylinder to which the igniter is related, and the sleeves 43 are provided with cams 126 (see Fig. 3) which impart to the rods 125 periodic reciprocating movement. The parts 118 and 119 are connected by a stout expansive spring 127 engaging collars 128 and 129 respectively on the parts 118 and 119, as best shown in Fig. 13. At its lower end the cylinder 106 is provided with a lateral bracket 130 (see Figs. 15 and 16), from which bracket an arm 131 depends (see Figs. 15 and 18). To this arm is fulcrumed by a stud 132 a lever 133, the upper end of which carries a roller 134, and the lower end of which is formed with a slot 135. The lower end of the piston 116 is provided with a wing 136, and when the lever 133 is in vertical position, as shown in Figs. 14 and 18, the upwardly moving piston engages its wing 136 with the roller 134, and the upward movement of the piston is for the time arrested, the sleeve 119, however, continuing its upward movement and compressing the spring 127.

From the bracket 130 an arm 137 projects (see Figs. 14 and 15) and on this arm is fulcrumed a lever 138, the upper end of which (shown broken away in Figs. 14 and 15) is intended to be connected with a governor or with a hand operative means to time the ignition period, as will hereinafter fully appear. The lower end of the lever 138 curves slightly and carries a roller 139 which plays loosely in the slot 135 of the lever 133, and which projects inward from said lever in the path of a cam plate 140 secured in the sleeve 119 (see Fig. 14). 141 indicates a spring for yieldingly holding the lever 138 in the position shown in Fig. 14, so that when the sleeve 119 begins its upward movement the piston 116 follows, until the wing 136 strikes the roller 134 whereupon the piston 116 dwells in its new position while the sleeve 119 continues its movement, storing energy in the spring 127. This operation continues until the cam 140 strikes the roller 139, whereupon the lever 138 is thrown outward, carrying with it the lever 133 and throws the roller 134 off of the wing 136. This releases the piston 116, and the spring 127 asserts itself, and brings about a continuing movement of the piston 116, which continued or final movement of the piston is so calculated as to bring about a compression of the gases within the cylinder 106, sufficient to ignite said gases by the heat of compression. The head 112 of the valve stem 110 has a laterally extending stud 142 projecting through a slot 143 in the cap 114 (see Fig. 20). To this stud is articulated a link 144 which extends downward at its lower end and is similarly connected to a toggle member 145. Said member is pivoted on the cylinder 106 by a pin 146 (see Fig. 14) and has its free end pivoted to a second toggle member 147, which when the valve 111 is in its closed position lies at one side of the roller 134 (see Fig. 14).

148 (see Fig. 19) indicates a spring which is applied to the toggle members 145 and 147 to hold them yieldingly in the normal position shown in Fig. 14. When, therefore, the action of the cam 140 throws the roller 134 off from the wing 136, said roller engages the toggle member 147, throwing the same outward and raising the toggle member 145, so that through the link 144 the head 112 is raised, compressing the spring 115 and lifting the valve 111. The organized operation of the igniter is accordingly as follows: When the upward movement of the piston 116 proceeds sufficiently to engage the wing 136 with the roller 134, the piston movement is arrested and the continuing movement of the sleeve 119 stores a certain amount of energy in the spring 137. This operation continues until the cam 140 strikes the roller 139, whereupon the roller 134 begins to roll off of the wing 136. In doing this the roller strikes the toggle member 147, and by the action of the toggle thus brought about, the valve 111 opens and allows a quantity of compressed gas to enter the cylinder 106. Continued outward movement of the roller results in its disengaging the toggle member 147, and consequently in the closing of the valve 111, under the action of the spring 115 thus entrapping a charge of gas in the cylinder 106. Simultaneously the roller 134 completely disengages the wing 136 and then the spring 127 asserts itself and rapidly and forcibly moves the piston 116 toward the valve 111 so compressing the mixture in the cylinder 106 as to cause it to flash into flame and at this time, since the spring 115 is weaker than the spring 127, the valve 111 opens and the flame propagated in the cylinder 106 is communicated to the power cylinder. Timing of the ignition may be effectually controlled by shifting the position of the roller 139 in the slot 135, so that said roller is struck sooner or later as the case may be, by the cam 140, and thereby the final compression in the igniter cylinder may be advanced or retarded according to the exigencies of the occasion. This regulation of the roller 139 is best brought about by vertically shifting the lever 138 either manually or by governor action, as will be understood by persons skilled in the art.

I will next describe the construction and operation of the carbureter regulating device, which is shown in detail in Figs. 21 and 22. In Fig. 21, 34 indicates a fragment of the carbureter before described, which may be of itself of any desired form. 149 indicates the air passage leading to the carbureter and this passage has a port 150 opening into the atmosphere. Said port is commanded by an inwardly opening valve 151, the stem 152 of which slides in a guide 153 attached to the walls of the passage 149. Said stem 152 is straddled by a lever 154, the lower end of which has its fulcrum 155 sustained on a bracket 156 projecting from the walls of the air passage 149. Sliding loosely on the stem 152 is a member 157 engaged by a spring 158 encircling the outer end of the stem 152, and bearing on its outer side against a head 159 on the outer extremity of said stem. This spring tends lightly to seat the valve 151 so that under ordinary operation the valve may open in response to the suction through the carbureter passages, as is usual in such devices. The member 157 is engaged, however, by two levers 160 fulcrumed on the lever 154, and by moving said lever rightward (referring to Fig. 21) the tension of the spring 158 may be increased to such an extent that the ordinary suction exerted in the carbureter will not unseat the valve. In this manner the free or atmospheric air supplied to the carbureter may be throttled at will. 161 indicates a pipe leading the compressed air from the tank 105, and discharging into a chamber 162 communicating by a port 163 with the passage 149. This port is commanded by a valve 164, which opens into the chamber 162 and which has its stem 165 movable freely in a guide 166 projecting from the walls of the passage 149. The stem 165 terminates in a head 167, and engaged with this head and with the walls of the passage 149 is an expansive spring 168 which holds the valve 164 seated. One or both of the levers 160 has its lower end pointed, or so disposed as to lie in the path of the head 167 of the stem 165 so that upon shifting the lever 154 leftward (referring to Fig. 21) said lever 160 will be engaged with said head 167. The levers 160 are fulcrumed on the lever 154 at a point 169, and 170 indicates a stop on the lever 154 for limiting the rightward movement of the lower arm of the lever 160. Joined to the upper arm of said lever 160 at 171 is a link 172, which extends through suitable guides into the crank case of the engine, and normally projects into the immediate vicinity of but not actually in contact with a cam 173 on the main shaft 40 (see Fig. 3). With this device, therefore, upon permitting the lever 154 to stand in its normal position (see Fig. 21) the ordinary sucking effort in the carbureter will periodically unseat the valve 151 and permit atmospheric air to be supplied to the carbureter in the ordinary manner. By throwing the lever 154 rightward the tension of the spring 158 is increased so that the free or atmospheric air supplied to the carbureter may be throttled to a degree dependent upon the degree of rightward movement of the lever 154. By moving the lever 154 to the left the lever 160 is engaged with the head 167 of the valve stem 165, and the link 172 is also moved into actual engagement with its actuating cam 173 (see Fig. 3). When the parts are in this adjustment the rotation of the cam 173 will impart a periodic reciprocation of the link 172, causing the lever 160 to be rocked, this rocking of the lever resulting in a periodic compression of the spring 158 to prevent the opening of the valve 151, and also in a simultaneous opening of the valve 164, thus admitting compressed air to the passage 149 and supplying such air to the carbureter, so that not only is a larger amount of liquid fuel absorbed by the air as it passes through the carbureter and a richer mixture secured, but this mixture is introduced into the engine cylinder above the automatic pressure, and thus the initial compression of the engine is increased. By a proper timing of the cam 173, the above described operations of the lever 160 may be made exactly to coincide with the charging period of the engine cycle, so that the compressed mixture will flow from the carbureter only during the charging or suction period above referred to.

By means of the above described improvements, I am enabled to operate the engine far more economically than under the ordinary practice, and at the same time I attain a much higher degree of flexibility of control and regulation.

The auxiliary air supply devices and the carbureter regulating devices are not intended for continual operation, but are placed under the control of the engine driver so that they may be resorted to whenever the conditions of the operation of the engine require, either for retarding the engine movement when running empty and simultaneously storing the compressed air in the reservoir 105, for starting the operation of one or both of the cylinders, for increasing the initial compression either by introducing cold compressed air or by introducing a compressed fuel mixture or by introducing both, and to throttle the free air supply to the carbureter. The igniter provides for a certain ignition of the cylinder charge without the danger or complication of a hot tube or spark igniters usually employed, and by means of the regulating devices provided for the igniter the period of ignition may be accurately timed, and finally by the manipulation of the clutch devices in the crank case either or both of the cylinders may be thrown into operation as desired, thus effecting economy in operating the engine under light loads, and also enabling the operation of the second cylinder to be started with perfect ease, the first cylinder being also easily started by the application of compressed air, as before described.

Various changes in the form, proportions and minor details of my invention may be resorted to at will without departing from the spirit and scope thereof; hence I consider myself entitled to all such variations as may lie within the terms of my claims.

Having thus described my invention, I claim as new and desire to secure by Letters Patent:

1. An engine having two cylinders and crank shafts respectively related thereto and driven therefrom, a main or engine shaft, and means for connecting either crank shaft with the main shaft at will, said means connecting said crank shafts at a fixed relative position to preserve the proper angularity of the cranks.

2. An engine comprising a base, two cylinders mounted thereon, crank shafts respectively related to the cylinders and driven therefrom, a main shaft mounted in the base intermediate the crank shafts, a gear on each crank shaft, gears meshed with the first named gears, and mounted loosely on the main shaft, means for connecting either of the second named gears to the main shaft to turn therewith, an igniter device for each cylinder, and means for driving the igniter devices respectively from the gears on the main shaft.

3. An engine having two cylinders and crank shafts related respectively thereto and driven therefrom, a valve mechanism for each cylinder, the valve mechanisms lying adjacent to each other, a main or engine shaft lying intermediate the crank shafts, means for driving said valve mechanisms from the main or engine shaft, and means for connecting either crank shaft with the main shaft.

4. An engine having two cylinders and crank shafts respectively connected thereto and driven therefrom, a valve mechanism for each cylinder, the valve mechanisms lying at the inner sides of the cylinders, a main or engine shaft lying between the crank shafts, two sleeves loose on the main shaft, means connecting the sleeves respectively with the crank shafts, means for fastening either sleeve to the main shaft, and means for operating the valve mechanisms respectively from said sleeves.

5. An engine comprising two cylinders and crank shafts respectively related thereto and driven therefrom, a main or engine shaft, gears mounted on the crank shafts, gears mounted loosely on the main shaft and meshed respectively with the crank shaft gears, and means for fastening either gear to the main shaft.

6. An engine comprising a base, two cylinders mounted thereon, crank shafts mounted in the base and respectively related to and driven from the cylinders, a main or engine shaft mounted on the base intermediate the crank shafts, and means for connecting either crank shaft with the main shafts.

7. An engine comprising a base, two cylinders mounted thereon, crank shafts respectively related to the cylinders and driven therefrom, a main shaft mounted in the base intermediate the crank shafts, a gear on each crank shaft, gears meshed with the first named gears, and mounted loosely on the main shaft, and means for connecting either of the second named gears to the main shaft to turn therewith.

8. An engine comprising a base, two cylinders mounted thereon, crank shafts respectively related to the cylinders and driven therefrom, a main shaft mounted in the base intermediate the crank shafts, a gear on each crank shaft, gears meshed with the first named gears, and mounted loosely on the main shaft, means for connecting either of the second named gears to the main shaft to turn therewith, a valve mechanism for each cylinder, and a means for driving the valve mechanisms respectively from the gears on the main shaft.

9. An engine comprising two cylinders and crank shafts respectively related thereto and driven therefrom, a main or engine shaft, a gear on each crank shaft, gears loose on the main shaft and meshed with the crank shaft gears, and means for connecting either of the last named gears with the main shaft to turn therewith, a valve mechanism for each cylinder, and means for driving the valve mechanisms respectively from the gears of the main shaft respectively.

10. An engine having two cylinders, crank shafts respectively related thereto and driven therefrom, a main or engine shaft, a gear fast on each crank shaft, gears loose on the main shaft and respectively meshed with the crank shaft gears, and clutch members sliding on the main shaft and respectively engageable with the second named gears to fasten said gears to the main shaft.

11. An engine having two independently operative working units, a main or engine shaft, and controllable friction clutches for connecting either or both of said units with said shaft in fixed relative positions, for the purpose specified.

12. An engine having two independently operative working units, a main or engine shaft, clutches for connecting either or both of said working units with said shaft, and means actuated by the forward motion of said units for locking the same in fixed relative positions, for the purpose specified.

13. An engine having two independently operative working units, a main or engine shaft, clutch members loose thereon and respectively operatively connected with said working units, additional clutch members sliding on the shaft and engageable respectively with the first named clutch members, and centrifugally actuated dogs mounted on one member of each clutch and adapted positively to engage the other members in fixed relative positions, for the purpose specified.

14. An engine having two independently operative working units, a main or engine shaft, and means actuated by the motion of said units to connect the same with the shaft in fixed relative positions.

15. An engine having two independently operative working units, a main or engine shaft, and centrifugal clutches actuated by the motion of said working units for positively connecting either or both of said units with said shaft in fixed relative positions.

16. An engine having two cylinders and crank shafts respectively connected thereto and driven therefrom, a main or engine shaft lying between the crank shafts, two sleeves loose on the main shaft, means connecting the sleeves respectively with the crank shafts, and controllable means for fastening either sleeve to the main shaft at will.

17. An engine having two independently operative working units, a main or engine shaft, two sleeves loose on said shaft, means connecting said sleeves respectively with said working units, and controllable means for fastening either sleeve to the main shaft at will.

18. An engine having two cylinders and crank shafts, connected respectively thereto and driven therefrom, valve mechanism for each cylinder, a main or engine shaft, means connecting each of said crank shafts to said engine shaft, and means for driving the valve mechanism of each cylinder from said main or engine shaft.

19. An engine having two cylinders and main shafts respectively connected thereto and driven therefrom, a main shaft, gearing connecting each of said crank shafts to said main shaft, an igniter device for each cylinder, and means for operating both of said igniter devices from said main shaft.

20. An engine having two independently operative working units, a main or engine shaft, and friction clutches actuated by the motion of said working units for positively connecting either or both of said units with said shaft in fixed relative positions.

21. An engine having two independently operative working units, a main or engine shaft, and centrifugally operated means actuated by the motion of said units to unite the same with the shaft in fixed relative positions.

22. An engine having two independently operative working units, a main or engine shaft, and means for connecting either or both of said units with said shaft in fixed relative positions to each other, said means being brought into operative position by the forward action of said units.

23. An engine having two independently operative working units, a main or engine shaft, controllable friction means for connecting either or both of said units with said shaft, and centrifugally-actuated means for positively locking the same in fixed relative positions.

24. An engine having two independently operative working units, a main or engine shaft, and separate means for connecting each of said units to said shaft, each of said means including a clutch having a centrifugally operated dog, and a clutch member adapted to engage with said dog and lock the corresponding engine unit to the main shaft in a predetermined relationship.

25. An engine having two independently operative working units, a main or engine shaft, and separate means for connecting each of said units to said shaft, each of said means including a clutch having a clutch member and a centrifugally operated dog adapted to engage with a single predetermined point on said clutch member to lock the corresponding engine unit to said shaft in a fixed and definite relationship.

26. An engine having two independently operative working units, a main or engine shaft, and separate means for connecting each of said units to said shaft, each of said means including a clutch member loose upon said engine shaft, a second clutch member sliding on the shaft and engageable with the first-mentioned clutch member, and a centrifugally actuated dog mounted on either member and adapted to positively engage with either member.

27. An engine having two independently operative working units, a main or engine shaft, and separate means for connecting each of said units to said shaft, each of said means including a clutch member loose upon said engine shaft, a second clutch member sliding on the shaft and engageable with the first-mentioned clutch member, and a centrifugally actuated dog mounted on one member and adapted to positively engage with the other member at a particular point thereon.

28. An engine having two independently operative working units, a main or engine shaft, and separate means for connecting each of said units to said shaft, each of said means including a clutch member loose on said engine shaft, a clutch member slidable thereon to engage the first-mentioned clutch, and a spring connected with the sliding clutch member and with a relatively stationary part, said spring turning upon the sliding of said clutch member, whereby the tension of the spring is exerted in opposite directions dependent upon the position of said sliding clutch member.

29. An engine having two independently operative internal combustion engine units, a main or engine shaft, controllable means for connecting either or both of said units with said shaft in fixed operating positions relative to each other, valve mechanism for each of said units, an igniter for each of said units, and means for operating said valves and said igniters from said engine shaft.

30. An engine having two power cylinders and crank shafts relatively related thereto and driven thereby, a main or engine shaft, means for connecting either or both of said crank shafts with the main shaft at will, valve mechanism for each of said cylinders, and means for controlling the valve mechanism of one cylinder, whereby it may operate as a power cylinder or as a compressor.

31. An engine having two power cylinders and crank shafts relatively related thereto and driven thereby, a main or engine shaft, means for connecting either or both of said crank shafts with the main shaft at will, independent valve mechanisms for one of said cylinders, one of said valve mechanisms being normally inoperative during the use of said cylinder as a power cylinder, and means for operating said last-mentioned valve mechanism from said engine shaft, whereby one of said cylinders may serve as a compression cylinder.

32. An engine having two power cylinders and crank shafts relatively related thereto and driven thereby, a main or engine shaft, means for connecting either or both of said crank shafts with the main shaft at will, independent valve mechanisms for one of said cylinders, one of said valve mechanisms being normally inoperative during the use of said cylinder as a power cylinder, manually controlled means for throwing said last mentioned valve mechanism into operation, and means for automatically operating the same, whereby said cylinder may serve as a compression cylinder.

33. An engine having two independently operative working units, a main or engine shaft, controllable friction clutches for each of said units, and a two-way spring for each of said clutches and adapted to hold the same in either its operative or inoperative position.

34. An engine having two independently operative working units, a main or engine shaft, controllable friction clutches for each of said units, a two-way spring for each of said clutches and adapted to hold the same in either its operative or inoperative position, and means for automatically locking said units to said shaft in definite relative positions.

35. An engine having two independently operative working units, a main or engine shaft, two sleeves connecting with said units, respectively, and normally loose on said main shaft, means for connecting either or both of said sleeves to said shaft at will, centrifugally-actuated means for locking the same in definite relative positions, and an ignition device for each of said units operated from its corresponding sleeve.

In testimony whereof I have signed my name to this specification in the presence of two subscribing witnesses.

FRANK REAUGH.

Witnesses:
L. B. GRIFFITH,
A. F. SPILMAN.